United States Patent [19]

Hergenrother et al.

[11] 4,180,647

[45] Dec. 25, 1979

[54] POLYPHOSPHAZENE COPOLYMERS CONTAINING MALONONITRILE AND SUBSTITUTED MALONONITRILE SUBSTITUENTS

[75] Inventors: William J. Hergenrother, Akron; Adel F. Halasa, Bath, both of Ohio

[73] Assignee: The Firestone Tire & Rubber Company, Akron, Ohio

[21] Appl. No.: 941,117

[22] Filed: Sep. 8, 1978

[51] Int. Cl.$^2$ .............................................. C08G 79/06
[52] U.S. Cl. ................................... 528/168; 528/362; 528/399; 528/374; 528/392
[58] Field of Search ......................... 528/399, 168, 362

[56] References Cited

U.S. PATENT DOCUMENTS

| | | | |
|---|---|---|---|
| 3,370,020 | 2/1968 | Allcock et al. | 528/399 |
| 4,018,822 | 4/1977 | Sharma et al. | 260/551 P |

*Primary Examiner*—Wilbert J. Briggs, Sr.

[57] ABSTRACT

Polyphosphazene copolymers are prepared which certain randomly distributed units represented by the formulas:

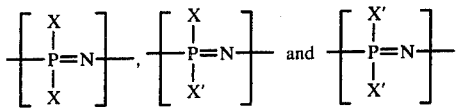

wherein X is —CR(CN)$_2$ in which R is H, a branched chain, a straight, or cyclic alkyl group containing from 1 to 12 carbon atoms or an aryl group or mixtures thereof, and wherein X' is selected from the group consisting of substituted and unsubstituted alkoxy, alkenyloxy, aryloxy, alkenylaryloxy, amino and mercapto groups or mixtures thereof.

In the copolymer units represented by the above formulas, all X substituent groups may be the same or they may be mixed and all X' substituent groups may be the same or mixed. In the mixtures, the X substituent groups may be mixtures of different —CR(CN)$_2$ groups and the X' substituent groups may be mixtures of alkoxy, alkenyloxy, aryloxy, alkenylaryloxy, amino and mercapto groups or mixtures within each group.

The copolymers of the invention can be utilized to form protective films and may also be utilized in applications such as for moldings, coatings, and the like where heat stability and solvent resistance are important.

10 Claims, No Drawings

POLYPHOSPHAZENE COPOLYMERS CONTAINING MALONONITRILE AND SUBSTITUTED MALONONITRILE SUBSTITUENTS

BACKGROUND OF THE INVENTION

This invention relates to polyphosphazene copolymers containing repeating

units in the polymer chain in which malononitrile or substituted malononitrile substituents and substituted and unsubstituted alkoxy, alkenyloxy, aryloxy, alkenylaryloxy, amino and mercapto substituents are attached to the phosphorus atom. More particularly, the invention relates to polyphosphazene copolymers containing substituents derived from malononitrile and substituted malononitrile and substituted and unsubstituted aliphatic and aromatic alcohols, amino compounds and mercaptan compounds.

Polyphosphazene polymers containing repeating

units in which various alkoxy, substituted alkoxy, aryloxy and substituted aryloxy groups are attached to the phosphorus atom and their method of preparation are described in the prior art as illustrated in the publication "Nitrogen-Phosphorus Compounds", Academic Press, New York, N.Y. 1972 by H. R. Allcock and "Poly(Organophosphazenes)", Chemtech, Sept. 19, 1975 by H. R. Allcock and in such U.S. Pat. Nos. as 3,515,688; 3,702,833; and 3,856,712.

However, none of the aforementioned publications and patents or for that matter, none of the prior art of which applicants are aware, discloses or suggests polyphosphazene copolymers containing malononitrile and substituted malononitrile substituents attached to the phosphorus atom or methods of preparing such copolymers.

SUMMARY OF THE INVENTION

In accordance with this invention, novel polyphosphazene copolymers containing malononitrile or substituted malononitrile and substituted or unsubstituted alkoxy, alkenyloxy, aryloxy, alkenylaryloxy, amino and mercapto substituents are prepared.

The copolymers of the invention contain randomly distributed units represented by the formulas:

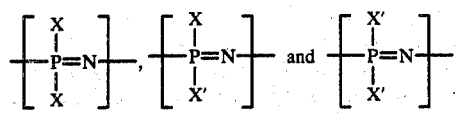

wherein X is —CR(CN)$_2$ in which R is H, a branched, straight chain or cyclic alkyl radial containing 1 to 12 atoms or an aryl group, X' is selected from the group consisting of substituted and unsubstituted alkoxy, alkenyloxy, aryloxy, alkenylaryloxy, amino and mercapto radicals, and the polymer can contain from 20 to 50,000 of such units.

In the copolymer units represented by the above formulas, all X substituent groups may be the same or they may be mixed and all X' substituent groups may be the same or mixed. In the mixtures, the X substituent groups may be mixtures of different —CR(CN)$_2$ groups and the X' substituent groups may be mixtures of alkoxy, alkenyloxy, aryloxy, alkenylaryloxy, amino and mercapto groups or mixtures within each group.

The copolymers are prepared by reacting a poly(dichlorophosphazene) having the formula —(NPCl$_2$)$_n$— in which n is from 20 to 50,000, with a mixture of an active sodium salt of malononitrile or a substituted malononitrile and a substituted or unsubstituted aliphatic or aromatic alcohol, amino compound or mercaptan compound in the presence of a tertiary amine.

The polymers can be used to prepare films and may be utilized in applications such as molding and coatings.

The specific proportion of X to X' subsituent groups incorporated in the copolymers of the invention may vary considerably depending upon chemical and physical properties desired in the copolymer and the particular end use application for which the copolymer is intended. Thus, for applications such as moldings, coatings, foams and the like, the copolymer should contain at least five (5) percent by weight of the X substituent.

DETAILED DESCRIPTION OF THE INVENTION

The term "polymer" as used hereinafter throughout this specification and claims is employed in the broad sense and includes copolymers, terpolymers, tetrapolymers and the like.

As indicated above, the polyphosphazene polymers of this invention are prepared by reacting a poly(dichlorophosphazene) polymer having the structure —(NPCl$_2$)$_n$—, in which n is from 20 to 50,000 with a mixture of a sodium salt of malononitrile or a substituted malononitrile and a substituted or unsubstituted aliphatic or aromatic alcohol, amino compounds or mercaptan compounds in the presence of a tertiary amine.

The preferred method of forming the "polymer" of this invention is described generally above and in detail hereinafter. However, the polymer of this invention may also be obtained by the derivatization process described in the aforementioned publications. In these publications, the general procedure for preparing poly(organophosphazenes) in which the organic substituents are alkoxy or aryloxy groups involves reacting a poly(-dichlorophosphazene) with the sodium salt of an aliphatic or aromatic alcohol, i.e. a sodium alkoxide or aryloxide. Thus, in the preparation of poly(organophosphazenes) having the above structures the poly(dichlorophosphazene) polymer can be reacted with a sodium salt of malononitrile or a substituted malononitrile to form the desired polymer.

The following description is directed to the preferred method of obtaining the polymer of this invention.

I. THE POLY(DICHLOROPHOSPHAZENE) POLYMER

Poly(dichlorophosphazene) polymers which are employed as starting materials in the process of this invention are well known in the art as illustrated in U.S. Pat. Nos. 3,370,020; 4,005,171 and 4,055,520 and the aforementioned publications of H. R. Allcock, the disclosures of which are incorporated herein by reference.

These polymers have the general formula $-(NPCl_2)_n-$, in which n may range from 20 to 50,000 or more. As described in the aforementioned references, the polymers are in general prepared by the thermal polymerization of cyclic oligomers having the formula $-(NPCl_2)_n-$, in which n is an integer of from 3 to 7, with the cyclic trimer and tetramer often comprising up to 90% of the oligomers.

The specific conditions of temperature, pressure and time employed in the thermal polymerization of the cyclic oligomers can vary considerably depending on whether or not the polymerization is catalyzed. Thus, temperatures may range from about 130° C. to about 300° C., pressures may range from a vacuum of less than about $10^{-1}$ Torr to superatmospheric and times may range from 30 minutes to about 48 hours.

A preferred process for preparing the poly(dichlorophosphazene) polymers used in the process of this invention is described in the aforementioned incorporated U.S. Pat. No. 4,005,171.

II. SUBSTITUENTS

The malononitriles and substituted malononitriles which may be employed in forming the copolymers of the invention are the malononitriles of the general formula $CR_2(CN)_2$ where R may be H, a branched, straight chain or cyclic alkyl radical with from 1 to 12 carbon atoms or an aryl radical. The R radicals may vary from one site to another in the malononitrile or may be identical at each site. Illustration examples of the malononitriles and substituted malononitriles which may be suitably employed are malononitriles, methyl malononitrile, ethyl malononitrile, hexyl malononitrile, phenyl malononitrile and the like.

As indicated heretofore, the polyphosphazene copolymers of the invention in addition to the $-CR(CN)_2$ substituent group may contain substituted or unsubstituted alkoxy, alkenyloxy, aryloxy, alkenylaryloxy, amino or mercapto groups.

Substituent groups represented by X' for use in these copolymers are:

The alkoxy groups (substituted or unsubstituted) may be derived from aliphatic alcohols having from 1 to 20 carbon atoms such as methanol, ethanol, propanol, isopropanol, n-butanol, sec-butanol, hexane, dodecanol and the like; fluoroalcohols, especially those represented by the formula $Z(CF_2)_nCH_2OH$ in which Z is hydrogen or fluorine and n is an integer from 1 to 10 as illustrated by trifluoroethanol, 2,2,3,3,3-pentafluoropropanol, 2,2,3,3,4,4,4-heptafluorobutanol; 2,2,3,3-tetrafluoropropanol, 2,2,3,3,4,4,5,5-octafluoropentanol, 2,2,3,3,4,4,5,5,6,6,7,7-dodecafluoroheptanol and the like. In instances where it is desired to incorporate mixed X' substituent groups in the copolymers, mixtures of the foregoing alcohols may be employed.

The alkenyloxy groups (i.e. oxy radicals of alkenyl compounds) may be derived from unsaturated aliphatic alcohols such as allyl alcohol, 3-butene-1-ol, 2,3,3-fluoropropen-1-ol and the like.

The aryloxy groups (substituted or unsubstituted) may be derived from aromatic alcohols including among others phenol; alkylphenols such as cresols, xylenols, p-, o-, and m- ethyl and propyl phenols and the like; halogen-substituted phenols such as p-, o-, and m-chloro and bromo phenols and di- or tri-halogen substituted phenols and the like; and alkoxy-substituted phenols such as 4-methoxyphenol, 4-(n-butoxy) phenol and the like. Mixtures of the foregoing aromatic alcohols may also be employed.

The alkenylaryloxy (i.e. alkenyl-substituted aryloxy) group may be derived from unsaturated aromatic alcohols such as vinylphenols, allylphenols, eugenol, isoeugenol and the like.

The amino groups may be derived from any of the amino compounds heretofore employe in the polyphosphazene polymer art. Thus, the amino groups may be derived from aliphatic primary and secondary amines such as methylamine, ethylamine, dimethylamine, ethylmethylamine and the like and aromatic amines such as those described in U.S. Pat. No. 4,042,561, incorporated herein by reference, as illustrated by aniline, halogen-substituted by anilines, alkyl-substituted anilines, alkoxy-substituted anilines and the like.

The mercapto groups may be derived from any of the mercaptan compounds heretofore employed in the polyphosphazene polymer art. Thus, for example, the mercaptan compounds described in U.S. Pat. No. 3,974,242 to Lanier et al, incorporated herein by reference, may be utilized. Representative of suitable mercaptan compounds as described in the aforementioned patent are methyl mercaptan and its homologs ethyl, propyl, butyl, aryl and hexyl mercaptans, thiophenol, thionapthols, benzyl mercaptan, cyclohexyl mercaptan and the like.

Preferred substituent groups represented by X' are alkoxy, especially fluoroalkoxy and aryloxy, especially chloroaryloxy.

III. THE TERTIARY AMINE

The use of the tertiary amine minimizes undesirable side reactions and at the same time acts as an effective acid scavenger.

Tertiary amines which may be employed in preparing the polymers of the invention are those represented by the general structure:

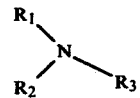

wherein $R_1$, $R_2$, and $R_3$ may each be alkyl containing from 1 to 8 cabon atoms. Thus, for example, the tertiary amine may be a trialkyl amine such as trimethylamine, triethylamine, tri-isopropylamine, tri-n-propylamine, tri-isobutylamine, tri-n-butylamine, and the like. In addition, tertiary amines such as pyridine, N,N,N',N'-tetramethylethylene diamine (TMEDA), dipipyridyl ethane, 1,4 diaza bicyclo (2'2'2) octane (DABCO), N-methyl pyrolle and N-methyl morpholine can also be utilized.

The preferred tertiary amines for use in preparing the polymers of the invention are triethylamine, N,N,N',N'-tetramethylethylene diamine and pyridine.

The copolymers of the present invention are prepared by reacting the poly(dichlorophosphazene) polymer and a substituent mixture of malononitrile or substituted malononitrile, a sodium salt of malononitrile or substituted malononitrile and a substituted or unsubstituted aliphatic or aromatic alcohol, an amino compound or mercaptan compound in the presence of a tertiary amine.

The specific reaction conditions and proportions of ingredients employed in preparing these copolymers can vary somewhat depending on factors such as the reactivity of the specific substituent mixture utilized, the particular tertiary amine employed, and the degree of substitution desired in the finished polymer. In general, reaction temperatures may range from about 25° C. to about 200° C. and times may range from 3 hours up to 7 days; lower temperatures necessitating longer reaction times and higher temperatures allowing shorter reaction times. These conditions are, of course, utilized in order to obtain the most complete reaction possible, i.e. in order to insure substantially complete conversion of the chlorine atoms in the polymer to the corresponding ester of the substituent mixture.

The above reaction is ordinarily carried out in the presence of a solvent. The solvent employed in the reaction should be a solvent for both the poly(dichlorophosphazene) polymer, the substituent mixture and the tertiary amine.

In addition, the materials in the reaction zone should be reasonably free of water, most preferably containing 0.01 percent by weight of water or less. The prevention of water in the reaction system is necessary in order to inhibit the reaction of the available chlorine atoms in the chloropolymer therewith. Examples of suitable solvents which may be employed include diglyme, triglyme, tetraglyme, toluene, xylene, cyclohexane, chloroform, dioxane, dioxalene, methylene chloride, tetrachloroethane, and tetrahydrofuran. The amount of solvent employed is not critical and any amount sufficient to solubilize the reaction mixture materials can be employed.

In general, the amount of the substituent mixture employed in the process should be at least molecularly equivalent to the number of available chlorine atoms in the polymer mixture. However, if desired, an excess of such compounds may be employed in order to insure substantially complete reaction of all the available chlorine atoms.

The following examples are submitted for the purpose of further illustrating the nature of the present invention and are not intended as a limitation on the scope thereof. Parts and percentages referred to in the examples are by weight unless otherwise indicated.

EXAMPLE I

Preparation of

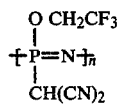

Copolymer 4.95 gm. of a 50% sodium dispersion in 120 cc of dry pentane (yielding 2.48 gm., 107.7 millimoles of sodium) and 150 cc of dry tetrahydrofuran (hereinafter THF) were charged into a 28 ounce beverage bottle in a water bath. After stirring and a sodium purge, a solution of 7.50 gm (113.5 millimoles) of malononitrile in 100 cc of dry THF was added. The water bath was held at 30°–40° C. during this addition and then was heated to 70° C. which permitted the pentane-water azeotrope to dry the solution.

After cooling 44.0 cc of 2.58 mole sodium trifluoroethoxide (113.5 millimoles) and then 141.7 gm. of a 8.83% THF solution of poly(dichlorophosphazene), 12.51 gm. (108.0 millimoles) was added after the water bath was heated at 80° C. for 20 hours and cooled, no PCL bonds could be detected by infrared spectroscopy. The resulting product was isolated by centrifugation treatment with carbon dioxide, a 10% sodium bromide and a hexane coagulation. The dry polymer from the soluble portion was 10.1 gm of a rubber. Water washing the salt layer gave 9.8 gm. of solid polymer that had 1.03% Cl, 2.23% sodium, a Tg of 35° C. and a Tm of 227° C. The polymer showed a 10% weight loss after aging 14 days at 300° F.

The THF soluble polymer yielded the following analysis. This is shown below along with the calculated analysis based on 96.6% trifluoroethoxide and 7.0% malononitrile in the polymer.

|  | C | H | N | P | Cl |
|---|---|---|---|---|---|
| Found (%) | 22.69 | 2.02 | 7.50 | 10.97 | 0.20 |
| Calculated (%) | 21.20 | 1.70 | 8.14 | 13.04 | 0 |

EXAMPLE II

This product was also prepared in 100 cc of THF with 2.71 cc (44 millimoles) malononitrile, 12.3 cc (88 millimoles) of triethylamine, 3.2 cc (44 millimoles) of trifluoroethanol, and 57.9 gm. of a 8.0% THF solution of poly(dichlorophosphazene) (40.0 millimoles). After 64 hours in a 70° C. rotary bath, a total of 8.0 gm. of THF insoluble powder was isolated which formed a film when pressed at 150° C. for 30 seconds at 2000 psi. This product had a Tg of 36° C. and a Tm of 184° C.

EXAMPLE III

Preparation of ─[(CH(CN)₂)(ClC₆H₄O)PN]ₙ─ Copolymer

To a 10 ounce beverage bottle was charged 2.90 gms. (44 millimoles) of malononitrile, 100 cc of alcohol free, dry chloroform, 5.66 gms. (44 millimoles) of p-chlorophenol, 12.3 cc (88 millimoles) of triethylamine and 55.6 gms. of an 8.35% cyclohexane solution of poly(dichlorophosphazene), 40.1 millimoles having a degree of polymerization of about 2600. After 20 hrs. in a 120° C. rotary bath, no soluble phosphazene linkage could be detected by Infrared spectroscopy.

Washing with methanol gave 9.3 gms. of a red plastic that could be pressed into a smooth film at 225° C. under pressure of 2000 psi.

We claim:

1. A polyphosphazene copolymer containing randomly distributed units represented by the formulas:

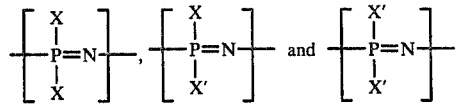

wherein X is —CR(CN)₂ in which R is selected from the group consisting of H, a branched chain, a straight chain, or cyclic alkyl group containing from 1 to 12 carbon atoms and an aryl group or mixtures thereof, and where X' is selected from the group consisting of substituted and unsubstituted alkoxy, alkenyloxy, aryloxy, alkenylaryloxy, amino and mercapto groups or mixtures thereof.

2. The copolymer of claim 1 wherein all R groups are identical.

3. The copolymer of claim 1 wherein the R groups are dissimilar.

4. The copolymer of claim 1 wherein the X substituent is —CH(CN)$_2$ and the X' substituent is —OCH$_2$CF$_3$.

5. The copolymer of claim 1 wherein the X substituent is —CH(CN)$_2$ and the X' substituent is —OC$_6$H$_4$Cl.

6. A method of preparing polyphosphazene copolymers containing randomly distributed units represented by the formulas:

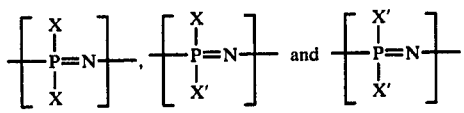

wherein X is —CR(CN)$_2$ in which R is selected from the group consisting of H, a branched chain, a straight chain and cyclic alkyl radical containing from 1 to 12 carbon atoms and an aryl radical or mixtures thereof, and wherein X' is selected from the group consisting of substituted and unsubstituted alkoxy, alkenyloxy, aryloxy, alkenylaryloxy, amino or mercapto groups or mixtures thereof; said method comprising reacting a poly(dichlorophosphazene) polymer having the formula —(NPCl$_2$)$_n$—, wherein n is from 20 to 50,000, with a mixture consisting of a malononitrile or substituted malononitrile and a substituted or unsubstituted aliphatic or aromatic alcohol, an amino compound and a mercaptan compound in the presence of a tertiary amine.

7. The method of claim 6 wherein X is —CH(CN)$_2$.

8. The method of claim 6 wherein said mixture consists of malononitrile and trifluoroethanol.

9. The method of claim 6 wherein said mixture consists of malononitrile and p-chlorophenol.

10. The method of claim 6 wherein said tertiary amine is triethylamine.

* * * * *

UNITED STATES PATENT AND TRADEMARK OFFICE
CERTIFICATE OF CORRECTION

PATENT NO. : 4,180,647
DATED : December 25, 1979
INVENTOR(S) : William L. Hergenrother and Adel F. Halasa It is certified that error appears in the above-identified patent and that said Letters Patent are hereby corrected as shown below:

Col. 4, line 9

"employe" should be -- employed --

Col. 4, line 17

"halogen-substituted by anilines" should be

--halogen-substituted anilines --

Signed and Sealed this

Twenty-eighth Day of October 1980

[SEAL]

Attest:

SIDNEY A. DIAMOND

Attesting Officer

Commissioner of Patents and Trademarks